United States Patent [19]

Cazalens

[11] Patent Number: 5,196,060
[45] Date of Patent: Mar. 23, 1993

[54] AIR-ENTRAINING ADJUVANT CONTAINING BLOOD PLASMA AS A SUBSTITUTE FOR SYNTHETIC COLLOID, AND PRODUCT OBTAINED

[76] Inventor: Georges Cazalens, 28 rue Victor Hugo, 47190 Aiguillon, France

[21] Appl. No.: 620,115

[22] Filed: Nov. 30, 1990

Related U.S. Application Data

[63] Continuation-in-part of PCT/FR89/00258, May 29, 1989.

[30] Foreign Application Priority Data

Jun. 1, 1988 [FR] France .................. 88 07311

[51] Int. Cl.$^5$ ................................. C04B 24/00
[52] U.S. Cl. ..................... 106/645; 106/124; 106/646; 106/655; 106/821
[58] Field of Search ............... 106/645, 821, 646, 655, 106/124

[56] References Cited

U.S. PATENT DOCUMENTS

| | | | |
|---|---|---|---|
| 943,157 | 12/1909 | Norman | 106/645 |
| 1,020,325 | 3/1912 | Stinebaugh | 106/645 |
| 2,400,541 | 5/1946 | Cone | 106/645 |
| 4,203,674 | 5/1980 | Laleman | 106/646 |

FOREIGN PATENT DOCUMENTS

| | | | |
|---|---|---|---|
| 2472413 | 7/1981 | France . | |
| 2481143 | 10/1981 | France . | |
| 2541991 | 9/1984 | France | 106/645 |
| 2600998 | 1/1988 | France . | |
| 45-003560 | 2/1970 | Japan | 105/645 |
| 142729 | 12/1930 | Switzerland . | |

*Primary Examiner*—Karl Group
*Assistant Examiner*—Anthony J. Green
*Attorney, Agent, or Firm*—Armstrong, Nikaido, Marmelstein, Kubovcik & Murray

[57] ABSTRACT

The present invention relates to an air-entraining adjuvant.

This adjuvant comprises animal whole blood and/or cruor serving as the actual air-entraining agent, and also comprises blood plasma as a stabilizer for the entrained air, preferably in pulverulent or atomized form. The proportion of blood plasma in the adjuvant is advantageously from 15 to 25% by weight. The said adjuvant also contains dispersants of the bentonite type and/or aluminomagnesium clay type.

This gives an adjuvant having an exceptional air-entraining capacity with a high stability; it is easy to work with as any type of mixer can be used.

13 Claims, No Drawings

AIR-ENTRAINING ADJUVANT CONTAINING BLOOD PLASMA AS A SUBSTITUTE FOR SYNTHETIC COLLOID, AND PRODUCT OBTAINED

This application is a continuation-in-part application of PCT International Application No. PCT/FR89/00258 filed May 29, 1989.

The present invention relates essentially to an air-entraining adjuvant containing blood plasma as a substitute for synthetic colloid, and to products obtained.

It is already known to use animal blood and extracts thereof, in liquid or powder form, as an air-entraining adjuvant in hydraulic binders for obtaining mortars and concretes.

For example, French patent document A-2 374 271 in the name of Laleman describes a novel use of blood and blood extracts containing hemoglobin as colloidal air-entraining agents for cements, mortars and concretes in the building and construction industry. This colloidal air-entraining agent is chosen from the group comprising animal whole blood, corpuscles, erythrocytes and hemoglobin, which are also commonly called cruor, in combination with at least one other colloid, this being a synthetic colloid which can be chosen from hydroxyethyl cellulose, hydroxypropylmethyl cellulose and carboxymethyl cellulose. In the description on page 2 line 35 to page 3 line 10, it is emphasized that in the case of animal blood extract, the latter must contain hemoglobin, which implies the use of cruor.

In addition, on page 3 lines 1 to 3, it is emphasized that corpuscles are an entity which results from removal of the plasma. In the Examples in the Table on page 6, water/cement ratios varying between 0.42 and 0.44 are given.

It is moreover emphasized that the various constituents must be mixed by means of a mixer operating at between 100 and 600 rpm.

The blood is normally used here in the form of a powder obtained either by drying, or by lyophilization, or by the application of any other methods known per se (page 3 lines 11 to 14).

It is clear that with the combination of powdered blood, as the air-entraining adjuvant, and a synthetic colloid, as recommended in the said document, the entrained air has a low stability in mortars and concretes, the air bubbles bursting as the cement sets.

Furthermore, mixing must be effected at a high rate of agitation with a mixer operating at between 100 and 600 rpm, which radically increases the proportion of entrained air bubbles which burst.

Also, and in contrast to the water/cement ratios of 0.42 and 0.44 given in the said document, it is apparent in practice that, to have a sufficient amount of water for setting of the hydraulic binder, for example the cement, it is necessary to have a water/cement ratio of the order of 0.6 to 0.65, relative to the hydraulic binder. In fact, a large amount of the water is absorbed by the synthetic colloid.

This excess water causes a substantial increase in the hydraulic shrinkage (about 2 mm/m), which results in higher risks of cracking after the concrete has hardened.

At the same time, this excess mixing water in lightweight concrete leads to a substantial systematic impairment of the mechanical strength properties.

Finally, on top of the major disadvantages mentioned above, the addition of synthetic colloid makes lightweight concrete difficult to work with because of its extremely high agglomerating power.

Likewise, in French patent document A-2 541 991, the air-entraining adjuvant used is liquid blood treated with a bacterial strain to remove the sugar; this has the particular disadvantage, in use, of having a nauseating odor, which is sometimes unbearable, and of requiring a large dose of adjuvant.

One object of the present invention is thus to solve the new technical problem which consists in providing an air-entraining adjuvant which has improved air-entraining capabilities, with a high stability of the entrained air bubbles, independently of the type of mixing used to mix it with the hydraulic binders and the other components of lightweight mortars and concretes.

Another object of the present invention is to solve the new technical problem which consists in providing an air-entraining adjuvant which allows an effective reduction in the amount of mixing water and leads to a decrease in the hydraulic shrinkage, initially and after setting, compared with the air-entraining adjuvants of the prior art.

Another object of the present invention is to solve the new technical problem which consists in providing an air-entraining adjuvant which is extremely easy to use in hydraulic binders and in any type of ready-to-use mixture, such as insulating lightweight coatings, mortars and concretes, without storage problems.

Another object of the present invention is to solve the new technical problem which consists in providing an air-entraining agent which improves the cohesion and adhesion properties of hydraulic binders on all types of masonry substrate, so that it can be used especially as an adjuvant in prepacked ready-mixed insulating mortars, concretes and coatings.

Another object of the present invention is to solve the new technical problem which consists in providing an air-entraining agent which makes it possible to produce pumpable mortars and concretes, i.e. mortars and concretes having densities of between about 300 and about 1700 kg/m$^3$, where the technologies of the prior art were never able to achieve these performance characteristics.

All these technical problems are solved together for the first time by the present invention in a satisfactory and extremely simple manner and at low cost.

Thus, according to a first aspect, the present invention provides an air-entraining adjuvant comprising animal whole blood and/or cruor as the air-entraining agent, the said adjuvant also comprising, as a stabilizer for the entrained air, blood plasma, preferably in pulverulent or atomized form, in an amount sufficient to stabilize the entrained air.

In a preferred embodiment of this adjuvant according to the invention, the blood plasma used in the said adjuvant totally replaces the synthetic colloids used in the prior art. These synthetic colloids used in the prior art were chosen for example from hydroxypropylmethyl celluloses, hydroxyethyl celluloses and carboxymethyl celluloses.

In one modified embodiment of the air-entraining adjuvant according to the invention, the blood plasma used in the said adjuvant is incorporated therein at a rate of about 15 to about 25% by weight of the total adjuvant.

In an advantageous modified embodiment, the blood plasma used according to the invention contains proteins in the following proportions by weight:

about 35 to 45% of albumins
about 40 to 45% of globulins
about 10 to 25% of fibrinogens In another modified embodiment of the adjuvant according to the invention, the animal whole blood and/or cruor mentioned above, in pulverulent or atomized form, represents from about 30 to about 60% by weight of the total adjuvant.

In another modified embodiment of the adjuvant according to the invention, the above-mentioned blood plasma is obtained by separation of the plasma from fresh whole blood, in particular from bovine whole blood, to which an anticoagulant has been added, the blood plasma being obtained by separation by centrifugation, for example in a dish centrifuge, in conventional manner. The plasma is then dried to give a powder, this being carried out in an atomizing tower through which drying air is passed at an appropriate temperature not exceeding 65° C. at the level of the particles of product, affording a dried plasma in micronized pulverulent form. The proportion of plasma is about 60% by volume of the total blood, which represents a proportion of about 40% of plasma in pulverulent form, relative to the total blood.

In another modified embodiment of the adjuvant according to the invention, the said adjuvant also comprises a dispersant, preferably clays of the bentonite type and/or aluminomagnesium clays and/or dispersions of mineral substances of the silica type (from 5 to 70%) in one or both of two types of organic medium, one being based on hydrocarbons containing emulsifiers and the other being based on non-ionic surfactants.

A currently preferred composition of the air-entraining adjuvant according to the invention is as follows, in percentages by weight:

| | |
|---|---|
| atomized animal whole blood and/or atomized cruor | 30 to 60% |
| atomized blood plasma | 15 to 25% |
| dispersants based on clays of the bentonite type and/or aluminomagnesium clays and/or dispersions of mineral substances of the silica type (5 to 70%) in one or both of two types of organic medium, one being based on hydrocarbons containing emulsifiers and the other being based on non-ionic surfactants (the remainder). | |

This air-entraining adjuvant according to the invention is advantageously incorporated in powder form into the hydraulic binders at a rate of about 0.3 to about 1% by weight, relative to the total hydraulic binder.

It should be emphasized here that this air-entraining adjuvant according to the invention makes it possible to entrain from 20 to 50% of air into a mortar consisting of one part of 0/2 mm sand and one part of cement in the CP 55 standard example, so this adjuvant has a high air-entraining capacity.

In addition, and by virtue of the presence of blood plasma, there is a synergistic effect with the animal whole blood or extracts, i.e. the blood corpuscles, in the form of cruor. The entrained air bubbles are very stable, which enables the various components of the hydraulic binder composition and the other customary components of mortars and concretes to be mixed using any known type of mixer, whether of the vertical or horizontal type or whether consisting of a truck mixer, and in particular without resorting to substantial mechanical agitation, in contrast to the adjuvants of the prior art. According to the invention, the speed of rotation of conventional mixers, such as concrete mixers, can be a few revolutions per minute, whereas with the adjuvants known in the prior art, the speed of rotation of the mixer was between 100 and 660 rpm, which resulted especially in appreciable destruction of the entrained air bubbles.

Furthermore, the adjuvant according to the invention is compatible with all the known cements and hydraulic binders and it can be incorporated into lightweight and super-light mortars and concretes which contain lightweight aggregates such as expanded glass beads, expanded clay, expanded shale, polystyrene beads, cork, vermiculite, perlite, pumice stone, etc.

According to another variant embodiment of the adjuvant according to the invention, which is particularly advantageous in the above-referred case of super-light concrete, to allow maximum air entrainment and by way of consequence, reduction of the polystyrene beads or other lightweight aggregates, which will substantially reduce the cost price of the m3 of lightweight concretes, the whole blood or the cruor and/or the dispersing agents will be reduced by 25 to 65% and replaced with the same quantity of the following products:

(I)—Sodium lauryl ether sulfate (C12–C16) anionic active material (II)—Proteins hydrolyzate according to the two following formulae:

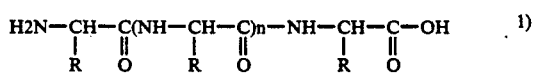

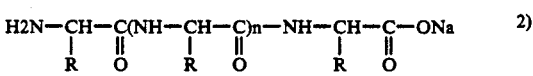

n=8–11

R=lateral chains of collagen amino acids.

(III)—Triethanolamine lauryl sulfate
(IV)—Triethanolamine lauryl ether sulfate
(V)—Triethanolamine alkyl ether sulfate in combination with triethanolamine alkyl lauryl sulfonate.

Products I and II exist in micronized powder form.

Products III to V are available on the market in liquid form and therefore must undergo a prior step of micronization to convert them to powder form.

Said products I to V can be used on their own or in combination but strictly in the proportion mentioned hereinabove.

Finally, the adjuvant according to the invention makes it possible to pump all lightweight mortars and concretes from 300 kg/m³.

An increase in the mechanical strength properties is also achieved because of the real decrease in the amount of mixing water, the water/hydraulic binder ratio being less than 0.45 and advantageously of the order of 0.40, in contrast to the adjuvants of the prior art, which require a water/cement ratio of between 0.60 and 0.65 in practice in order to obtain complete hydration of the hydraulic binder.

Further objects, characteristics and advantages of the invention will become clearly apparent on reading the following explanatory description referring to the single Example below, which is given simply by way of illustration and cannot therefore in any way limit the scope of the invention.

EXAMPLE 1

An insulating lightweight concrete can be prepared from the following composition, which makes it possible to obtain one cubic meter of lightweight concrete with a density of about 600 kg/m$^3$:

| | |
|---|---|
| class CPA 55 cement | 350 kg |
| 0/3 mm Seine sand | 160 kg |
| adjuvant according to the invention at 0.4%/cement | 1.4 kg |
| polystyrene beads | 660 liters |
| setting water | 140 liters |

This composition is mixed in a conventional concrete mixer at a speed of rotation well below 100 rpm, for example of about 30 rpm.

By way of example, a particular adjuvant which can be used is the air-entraining adjuvant according to the invention which has the following composition, in percentages by weight:

| | |
|---|---|
| atomized animal whole blood | 45 |
| atomized blood plasma | 20 |
| bentonite and/or aluminomagnesium clays and/or powder dispersion of a mineral substance of the silica type (5 to 70%) in an organic medium of two types, one being based on hydrocarbons containing emulsifiers and the other being based on non-ionic surfactants (the remainder, i.e. 35%). | |

The use of this air-entraining adjuvant according to the invention, incorporated in the above lightweight concrete composition, gives the following characteristics after the concrete has hardened:

- compressive strength measured on a cube of 10 cm side length: 3.7 MPa
- shrinkage: 830 μm/m
- air entrainment: 25 to 35% by volume
- water/cement ratio: about 0.40

Thus it is seen that a very high compressive strength is obtained after 28 d, together with exceptional air entrainment with a high stability.

This is due to the use of blood plasma as a stabilizer for the entrained air bubbles, combined with animal whole blood or cruor used as the air-entraining agent.

It is understood that the invention can form the subject of various modified embodiments without departing from its general framework.

The invention also covers the use of the air-entraining adjuvant as a plasticizing and water reducing adjuvant and as an adjuvant with a fluidizing secondary effect on mortars and concretes, as well as the products obtained, such as lightweight and super light-weight concretes and insulating lightweight mortars and coatings for improving the heat and sound insulation of buildings, the said products being manufactured or prefabricated using the air-entraining adjuvant according to the invention.

According to a particular invention embodiment, a setting of the proportion of entrained air is performed by adding a predetermined amount of an anti-foaming agent. This anti-foaming agent, selected among any anti-foaming agent well known to one skilled in the art, must be compatible with the hydraulic cement. It can be cited for instance alkylpolyalkyl-oxyethers, triisobutyl-phosphates or the phosphate esters of fat alcohol), this being not limitative.

EXAMPLE 2

A super-light weight concrete of same density as in example 1 is prepared by replacing 25 to 65% of the blood and/or dispersing agents, with an equivalent quantity of one of products I to V, using 115 to 260 liters of polystyrene beads less. This definitely emphasizes the increase in the quantity of occluded air.

What is claimed is:

1. A hydraulic binder including an air entraining adjuvant comprising at least one of animal whole blood and cruor as an air-entraining agent and further comprising blood plasma as a stabilizer for entrained air in an amount of about 15 to about 25% by weight of the total adjuvant and such that the total adjuvant does not have the composition of animal whole blood.

2. A hydraulic binder according to claim 1, wherein said blood plasma is in pulverulent or atomized form.

3. A hydraulic binder according to claim 1 or 2, wherein said blood plasma comprises about 15 to about 25% by weight of the total adjuvant.

4. A hydraulic binder according to claim 2, wherein the blood plasma contains proteins in the following proportions by weight:
- 35 to 45% of albumins
- 40 to 45% of globulins
- 10 to 25% of fibrinogens.

5. A hydraulic binder according to claim 2, wherein at least one of the animal whole blood and cruor, in pulverulent or atomized form, represents from 30 to 60% by weight of the formulation of the adjuvant.

6. A hydraulic binder according to one of claims 1 or 2, wherein the adjuvant further comprises at least one of a dispersant and a dispersion, the dispersant selected from the group consisting of bentonite clays and aluminomagnesium clays, and the dispersion containing silica mineral substances in amounts from 5 to 70% in at least one organic medium selected from a hydrocarbon medium containing emulsifiers and a medium containing non-ionic surfactants.

7. A hydraulic binder according to one of claims 1 or 2, wherein the adjuvant further comprises at least one of a dispersant and a dispersion, the dispersant selected from the group consisting of bentonite clays and aluminomagnesium clays and the dispersion comprising silica mineral substances in amounts from 5 to 70% in at least one organic medium selected from a hydrocarbon medium containing emulsifiers and a medium containing non-ionic surfactants.

8. A hydraulic binder according to claim 1, wherein the adjuvant is incorporated into the hydraulic binder in an amount of about 0.3 to about 1% by weight, relative to the weight of the hydraulic binder.

9. A hydraulic binder according to claim 1 or 2, wherein the blood plasma is in a micronized pulverulent form obtained by drying blood plasma at a temperature not exceeding 65° C.

10. A hydraulic binder according to claim 1, wherein the adjuvant contains an anti-foaming agent as a setting agent to set a proportion for entrained air, the anti-foaming agent selected from alkylpolyalkyl-oxyethers, triisobutylphosphates and phosphate esters of fat alcohols.

11. A hydraulic binder according to claim 1, wherein 25 to 65% of at least one of the animal whole blood and the cruor are replaced by the same quantity of at least one of the products from the group consisting of:

(I)—sodium lauryl ether sulfate ($C_{12}$–$C_{16}$) containing product (II)—product according to the two following formulae:

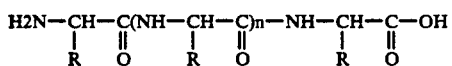

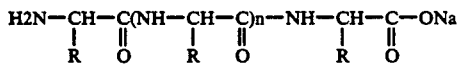

where
n=8–11 and
R=lateral chains of collagen amino acids.

(III)—triethanolamine lauryl sulfate
(IV)—triethanolamine lauryl ether sulfate
(V)—triethanolamine alkyl ether sulfate in combination with triethanolamine alkyl aryl sulfonate.

12. Products including light and superlight concretes and insulating lightweight mortars and coatings for improving the heat and sound insulation of buildings, the said products including a hydraulic binder containing an air-entraining effective amount of an air-entraining adjuvant according to claim 1.

13. A hydraulic binder according to claim 6 wherein 25 to 65% of at least one of the animal whole blood, the cruor and the dispersing agents are replaced by the same quantity of at least one of the products from the group consisting of:

(I)—sodium lauryl ether sulfate ($C_{12}$–$C_{16}$) containing product (II)—product according to the two following formulae:

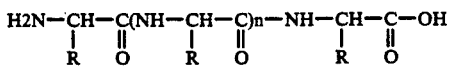

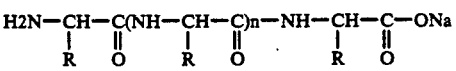

where
n=8–11 and
R=lateral chains of collagen amino acids.

(III)—triethanolamine lauryl sulfate
(IV)—triethanolamine lauryl ether sulfate
(V)—triethanolamine alkyl ether sulfate in combination with triethanolamine alkyl aryl sulfonate.

* * * * *